(12) United States Patent
Hukelmann

(10) Patent No.: US 12,089,607 B2
(45) Date of Patent: Sep. 17, 2024

(54) DEVICE FOR PRODUCING MEAT PRODUCTS

(71) Applicant: hs-tumbler GmbH, Quakenbrueck (DE)

(72) Inventor: Bernhard Hukelmann, Quakenbrueck (DE)

(73) Assignee: HS-TUMBLER GMBH, Quakenbrück (DE)

( * ) Notice: Subject to any disclaimer, the term of this patent is extended or adjusted under 35 U.S.C. 154(b) by 626 days.

(21) Appl. No.: 17/349,373

(22) Filed: Jun. 16, 2021

(65) Prior Publication Data

US 2021/0307340 A1     Oct. 7, 2021

Related U.S. Application Data

(62) Division of application No. 15/112,330, filed as application No. PCT/EP2015/052003 on Jan. 30, 2015, now Pat. No. 11,076,606.

(30) Foreign Application Priority Data

Jan. 31, 2014   (DE) .......................... 102014201819

(51) Int. Cl.
*A22C 7/00*     (2006.01)
*A22C 9/00*     (2006.01)
(Continued)

(52) U.S. Cl.
CPC ............. *A22C 7/0046* (2013.01); *A22C 7/003* (2013.01); *A22C 9/005* (2013.01); *A23L 13/03* (2016.08);
(Continued)

(58) Field of Classification Search
CPC ....... A22C 7/0061; A22C 9/004; A22C 9/005; A22C 7/0046; A22C 7/0069;
(Continued)

(56) References Cited

U.S. PATENT DOCUMENTS 4,409,704 A   10/1983   Seiffhart
4,941,379 A    7/1990   Gasbarro
(Continued)

FOREIGN PATENT DOCUMENTS

CH     670035 A5    5/1989
DE     7335320     12/1973
(Continued)

OTHER PUBLICATIONS

International Search Report from the corresponding International Patent Application No. PCT/EP2015/052003, dated Apr. 16, 2015.

*Primary Examiner* — Matthew Katcoff
(74) *Attorney, Agent, or Firm* — Greer, Burns & Crain, Ltd.; Steven P. Fallon

(57) ABSTRACT

A device for producing meat products includes an assembly formed from a plurality of walls maintainable in a fixed relationship to one another during a joining operation, surfaces of the plurality of walls defining work surfaces disposed to surround raw pieces of meat placed therein to be joined. A drive mechanism is configured to drive the assembly, which can form a cooking container such as a cooking box, along a first axis in a reciprocating movement of at least 10 mm along the first axis at frequency of at least 1 Hz and to drive the assembly along a second axis in a reciprocating movement of at least 10 mm along the second axis at frequency of at least 1 Hz, wherein the first axis and the second axis are angled with respect to each other, and the drive mechanism drives the assembly at different frequencies along the first and second axes.

21 Claims, 5 Drawing Sheets

(51) Int. Cl.
  *A23L 13/00* (2016.01)
  *A23L 13/50* (2016.01)
  *A23L 13/60* (2016.01)
  *A23L 13/72* (2023.01)
  *A23L 13/77* (2023.01)
  *A23P 30/10* (2016.01)
  *A47J 43/20* (2006.01)
  *B30B 11/00* (2006.01)
  *B30B 11/02* (2006.01)

(52) U.S. Cl.
  CPC .............. *A23L 13/52* (2016.08); *A23L 13/55* (2016.08); *A23L 13/67* (2016.08); *A23L 13/72* (2016.08); *A23L 13/77* (2023.01); *A23P 30/10* (2016.08); *A47J 43/20* (2013.01); *B30B 11/007* (2013.01); *B30B 11/02* (2013.01)

(58) Field of Classification Search
  CPC ......... A22C 7/0023; A22C 7/003; B30B 9/20; B30B 1/26; B30B 1/261; B30B 1/266; A23P 30/10; A23L 13/70
  See application file for complete search history.

(56) References Cited

U.S. PATENT DOCUMENTS

| | | | |
|---|---|---|---|
| 2006/0141108 | A1 | 6/2006 | Tene |
| 2011/0033587 | A1 | 2/2011 | Jong et al. |

FOREIGN PATENT DOCUMENTS

| | | |
|---|---|---|
| DE | 7912029 U1 | 12/1979 |
| DE | 4026501 A1 | 2/1992 |
| DE | 4324626 | 1/1995 |
| DE | 10309467 B3 | 5/2004 |
| DE | 102006035730 A1 | 1/2008 |
| DE | 102009014293 A1 | 9/2010 |
| DE | 202010005393 U1 | 10/2011 |
| EP | 1139798 B1 | 4/2004 |
| EP | 1916902 B1 | 12/2009 |
| EP | 2468105 A1 | 6/2012 |
| EP | 2671481 A1 | 5/2013 |
| FR | 2163850 A5 | 7/1973 |
| GB | 862273 | 3/1961 |
| GB | 1078761 | 8/1967 |
| RU | 2361405 C2 | 7/2009 |
| WO | 9714314 A2 | 4/1997 |
| WO | 2007023155 A1 | 3/2007 |
| WO | 2007145516 A2 | 12/2007 |
| WO | 2013148322 A1 | 10/2013 |

DEVICE FOR PRODUCING MEAT PRODUCTS

PRIORITY CLAIM AND REFERENCE TO RELATED APPLICATION

This is a divisional of and claims priority under 35 U.S.C. §§ 120 and 121 from prior application Ser. No. 15/112,330, which was filed on Jul. 18, 2016 and is incorporated by reference herein, which application was a 35 U.S.C. 371 US National Phase and claims priority under 35 U.S.C. § 119, 35 U.S.C. 365(b) and all applicable statutes and treaties from prior PCT Application PCT/EP2015/052003, which was filed Jan. 30, 2015, which application claimed priority from German Application DE 10 2014 201 819, which was filed Jan. 31, 2014.

FIELD

A field of the invention is meat processing devices, and particularly devices that can join together and cook raw pieces of meat.

BACKGROUND

EP 1139798 B1 describes the insertion of pieces of meat, which have been rumbled in a generic method, into a mold and the cooking of these pieces of meat in the mold.

DE 4324626 A1 describes a rumbling or rubbing machine for raw meat, which has a driven paddle for loading and stirring raw pieces of meat in a container.

DE 4026501 A1 describes a conventional rumbling machine with a rotating drum, on the inner surface of which driving dogs are attached, which take up pieces of meat and drop them free again. For the treatment raw pieces of meat with such rumbling machines, it is suggested to provide for cooling bodies during the mechanical loading of the pieces of meat within the drum.

These known devices for treatment of raw pieces of meat by mechanical loading are disadvantageous in that for sufficient mechanical loading for the meat juice to flow out resp. for sticking of the raw pieces of meat, the operation takes much time, for example several hours for drums. A further disadvantage, in particular of open drums for rumbling, is that the pieces of meat are treated in contact with ambient air if no complex vacuuming of the drum is performed. Furthermore, such drums require that the raw pieces of meat are freely movable, so that a treatment of a plurality of pieces of meat is not possible within a common sheath. A disadvantage lies in that this process generally increases the germ load of the product.

SUMMARY OF THE INVENTION

A device for producing meat products includes an assembly formed from a plurality of walls maintainable in a fixed relationship to one another during a joining operation, surfaces of the plurality of walls defining work surfaces disposed to surround raw pieces of meat placed therein to be joined. A drive mechanism is configured to drive the assembly, which can form a cooking container such as a cooking box, along a first axis in a reciprocating movement of at least 10 mm along the first axis at frequency of at least 1 Hz and to drive the assembly along a second axis in a reciprocating movement of at least 10 mm along the second axis at frequency of at least 1 Hz, wherein the first axis and the second axis are angled with respect to each other, and the drive mechanism drives the assembly at different frequencies along the first and second axes.

BRIEF DESCRIPTION OF THE DRAWINGS

Preferred embodiments of the invention will be described more precisely with reference to the figures, which show schematically in FIG. 1 a first embodiment of the device,
in FIG. 2 a first embodiment of the device,
in FIG. 3 a first embodiment of the device,
in FIG. 4 another first embodiment of the device,
in FIG. 5 a second embodiment of the device,
in FIG. 6 a second embodiment of the device and
in FIGS. 7 to 9 a second embodiment.

DETAILED DESCRIPTION OF THE PREFERRED EMBODIMENTS

Figure 1:
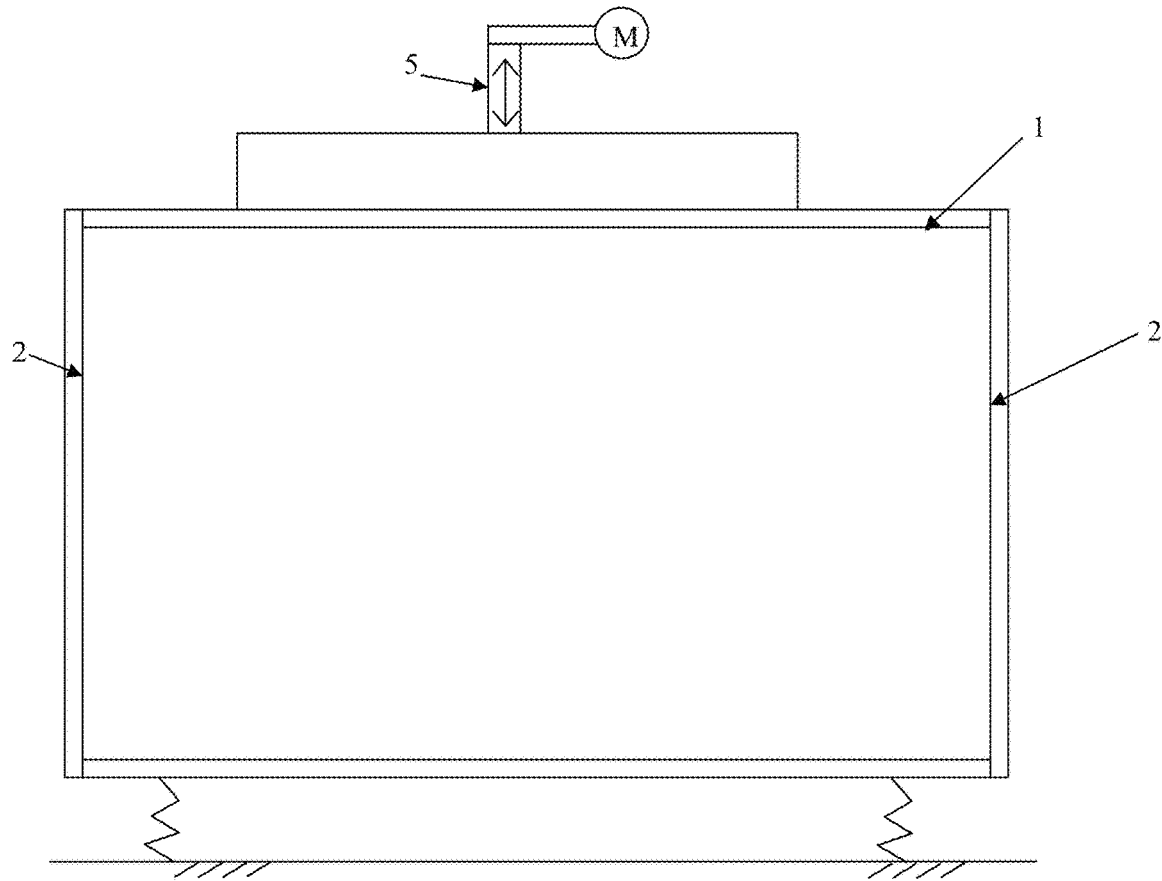

The present invention concerns a device for producing meat products with raw pieces of meat, which are joined together and subsequently cooked, e.g. in a form such as boiled ham. Optionally, the raw pieces of meat can uptake aqueous compositions, e.g. liquid flavor, by means of the process in particular for seasoning and/or in order to compensate for weight losses during the subsequent cooking and/or marinated by means of the process with aqueous or oily compositions.

The device is characterized in that it effects rapid joining of raw pieces of meat through an effective mechanical loading on them, which allows for a considerably shorter duration of this process step compared to the treatment with conventional rumbling machines or tumblers. Preferably, the device and the process allow to mechanically subject to load raw pieces of meat in a mold, optionally in an elastic sheath or a rigid mold, e.g. a cooking box, until their joining resp. sticking occurs, e.g. through outflow of meat juice and/or decompaction of their structure. The mechanical loading of raw pieces of meat up to their joining is also called rumbling, rubbing or tumbling.

The invention provides a device for applying a mechanical loading on raw pieces of meat for use in manufacturing meat products, allowing to carry out a faster process for producing meat products, in particular mechanical loading the raw pieces of meat up to them sticking together and, preferably, the raw pieces of meat can be contained in a sheath. A further object is to provide a process and a device for fast introduction of an aqueous or oily composition into raw meat, e.g. for marinating. While doing so, aqueous compositions are to compensate e.g. weight losses during subsequent cooking The invention achieves the object by the features of the claims, in particular with a device and the use thereof as meat treatment machine for producing meat products, resp. with a process, which can be carried out in particular with the device. The device has work surfaces, which span over resp. comprise an internal volume, at least one work surface of which has a drive for reciprocating movement, e.g. with a frequency of at least 0.5 Hz, in particular at least 1 Hz, preferably at least 5 Hz, more preferably at least 10 Hz, more preferably at least 50 Hz. The reciprocating movement of the work surface is preferably performed with an amplitude that is adapted to the mass of raw meat, e.g. at least 0.5 cm to 10 cm for 10 kg of raw meat. Generally preferably, the device and the process therefore has a fixed or adjustable amplitude for the reciprocating movement. The at least one driven work surface serves for loading the at least one work surface against raw pieces of meat, which are arranged in the internal volume spanned over by the work surfaces. Preferably, the raw pieces of meat are cooked following the process, e.g. in a mold for producing boiled ham.

The at least one work surface can be driven to perform a reciprocating movement relatively against the pieces of meat by being fixed relative to the other work surfaces and these being driven together for the reciprocating movement, so that it is driven by the inertia of the pieces of meat relatively against them, or the at least one work surface can be driven relative to at least one other work surface, so that the at least one driven work surface can load raw pieces of meat against at least one other work surface. The work surfaces can be continuous and tightly encompass the internal volume, in particular in embodiments, in which the raw pieces of meat are arranged directly on the work surfaces. Alternatively, the work surfaces can be discontinuous and encompass the internal volume with a spacing from one another, so that e.g. gaps are formed between neighboring work surfaces, in particular if the internal volume is lined by an elastic sheath and/or by a rigid sheath, in which the raw meat is to be arranged. Discontinuous work surfaces can consist of a grating or of spaced rods and form e.g. a grating cage or rod cage around the internal volume. Preferably, an elastic or a rigid sheath is closed. More preferably, an elastic or a rigid sheath contains the raw pieces of meat without air inclusions resp. under vacuum. An elastic sheath can e.g. consist of a single- or multi-layer plastic foil, optionally with a reinforcing fabric on the external side. An elastic sheath can also be a stiff plastic foil or a metal sheet, which is annularly closed and the cross-section of which is open terminally or is covered by an elastic foil. A rigid sheath can e.g. be a rigid can made of plastics and/or metal. The amplitude and/or frequency at which the work surface is driven can be controlled depending on a signal of a sensor, which is e.g. a conductivity measuring device, a pressure sensor, a conductivity sensor, a pH sensor or a color sensor. Further optionally, the amplitude and/or frequency can be predetermined depending on the meat product to be produced from the raw pieces of meat or controlled depending on a signal of a sensor in predetermined dimension according to an algorithm that is specific for the meat product to be produced. So it is preferred to adjust the amplitude and/or frequency as well as the duration of the reciprocating movement for boiled ham as meat product such that sticking together of the raw pieces of meat is achieved, resp. for cooked sausage such that the raw pieces of meat do not stick together.

In a first embodiment, in which the work surfaces are fixed relative to one another or at least one work surface is arranged movably relative to another one, the raw pieces of meat arranged in the internal volume that is spanned over by the work surfaces are mechanically loaded by the pulse, which is produced by the reciprocating movement. The reciprocating movement can therefore also be called shaking.

Generally, the reciprocating movement can take place along a motion axis, along two or three motion axes, which are each at an angle with respect to each other, e.g. in 90°, in particular for a fixed assembly of the work surfaces with respect to one another. Here, it is preferred that the reciprocating movement along each one of the motion axes is performed with a frequency of at least 0.5 Hz. For a reciprocating movement along two motion axes, an assembly of work surfaces that are fixed with respect to one another is e.g. moved along a Lissajous figure. Here, it is preferred that the reciprocating movement takes place along two or three motion axes each at a different frequency, e.g. with a difference of 5 to 50% of the frequencies with respect to the higher frequency. For two motion axes, which are at 90° to each other, the reciprocating movement can take place along the first motion axis e.g. at a frequency of 5 Hz and along the second motion axis at 0.1 to 4.9 Hz, in particular at 4.1 to 4.8 Hz.

Generally, the raw pieces of meat can be treated with the process in a mixture with solid salt and/or a liquid composition, which contains e.g. spices and/or salt. It has shown that the process then leads to effective uptake of salt, e.g. distributed in dissolved form in the raw meat, and/or water with spice. Accordingly, the process can also effect salting and marinating of raw meat, when treating raw meat with an aqueous composition for uptaking this composition in the meat. In this embodiment, the device can have a detector for determination of the proportion of aqueous composition, which is present within the internal volume in addition to the raw pieces of meat, wherein the drive motor is controlled depending on the detector, e.g. the drive motor is stopped when the detector detects an aqueous composition below a predefined proportion. In this embodiment, the device is set up e.g. to stop the drive motor for the reciprocating movement if no free aqueous composition is determined in addition to the raw meat.

Generally, in particular in the first embodiment, at least one of the work surfaces can be fixed in different positions in order to adjust the internal volume in a predefined ratio to the raw meat. A work surface can e.g. be fixable in a first position, in which the internal volume comprised by the work surfaces is filled only proportionately, e.g. to 70 to 90% with raw pieces of meat, in particular during the reciprocating movement, and the work surface can be subsequently moved to a second position and fixed in this position for the cooking, in which second position the raw pieces of meat are pressed against one another, e.g. until the internal volume comprised by the work surfaces is completely filled with raw pieces of meat.

In a second embodiment, at least one work surface, which is arranged movably relative to another one, is driven to a reciprocating movement relatively against another work surface, so that the pulse of this reciprocating movement loads the raw pieces of meat against the work surfaces, which span over the internal volume. An assembly of the work surfaces with respect to one another, in which a work surface is arranged movably relatively against another, can be e.g. a conventional cooking box, in which a wall, e.g. an end wall, which forms a work surface, is movable relatively against the other walls.

According to the invention, the raw pieces of meat can be arranged in a sheath, which is formed elastically in all embodiments, e.g. by a plastic foil, or can be rigid, e.g. a can, optionally made of metal sheet or plastics. Accordingly, the device optionally has an elastic or a rigid sheath within the internal volume spanned over by the work surfaces, in which the raw pieces of meat are to be arranged. Further optionally, the pieces of meat can be arranged in a cooking box, the one wall of which is movable relative to the other one, or in a cooking box, the walls of which are fixed to one another in a state arranged around the internal volume. Here, the walls form the work surfaces. Optionally, a sheath can be arranged within a cooking box. Accordingly, for the device, the internal volume spanned over by the work surfaces can be lined by an elastic sheath or a rigid sheath for arranging the raw pieces of meat therein. In particular in embodiments, in which the internal volume is comprised resp. limited by a cooking box, which forms the work surfaces fixed to one another in an assembly, these 2 work surfaces are loaded against the raw pieces of meat for movement along a motion axis, which runs perpendicular to 2 work surfaces. For a movement along two motion axes arranged perpendicular to each other, the work surfaces arranged at an angle >0°, in particular in perpendicular, with respect to the motion axes act against the raw pieces of meat. Accordingly, for a movement of the work surfaces fixed to one another in an assembly, which surfaces are formed e.g. by a cooking box, along three motion axes arranged at an angle, e.g. arranged perpendicular to one another, all work surfaces act against the raw pieces of meat.

Optionally, work surfaces can have at least two electric contacts, which form a conductivity sensor, e.g. two work surfaces opposite to each other, which are fixed relative to each other. Further optionally, a sheath, which is arranged in the internal volume and in which the raw pieces of meat are to be arranged, can have electrically conductive sections, which abut to such electric contacts of the work surface, or a sheath can have a conductivity sensor. In this embodiment, the device has a conductivity measuring device resp. resistance measuring device, in order to measure the change in electric conductivity resp. in electric resistance of the raw pieces of meat. Since the electric resistance resp. the impedance of raw pieces of meat decreases with increasing mechanical load, the device can have a control unit, which emits a signal and/or stops the drive upon reaching a predetermined absolute or relative change in the resistance resp. the conductivity.

Further optionally, work surfaces can have electric contacts for supplying electric voltage, which are connected with a generator for generation of electric current. The electric current can have electric pulses, e.g. high voltage pulses, in particular with pulse powers of approx. 3 to 10 MW, preferably 5 MW, for a pulse duration of 10 to 30 µs, for a time of 3 to 5 ms between the pulses, for a mean power of 25 to 50 kW, preferably approx. 25 kW, in order to open cell walls of the raw pieces of meat, which thus favor a material exchange. Alternatively or additionally, the electric current can have a continuous power for heating the raw pieces of meat, e.g. from generators for the ohmic heating, e.g. with a power of 1 to 150 KW, preferably 10 to 35 kW or 15 to 25 kW. Here, a sheath can be arranged in the internal volume, which abuts to the work surfaces and has electrically conductive sections at least adjacent to the electric contacts or is fully electrically conductive. Further optionally, the work surface can have at least in sections electric contacts, which have needle-shaped attachment parts. Such needle-shaped attachment parts of electric contacts can pierce through a sheath, e.g. foil, in order to establish an electronic contact to the raw pieces of meat.

The assembly of the work surfaces around an internal volume, in which the raw pieces of meat are to be arranged and the drive of at least one work surface to perform a reciprocating movement at the frequency leads to an intensive mechanical loading of the raw pieces of meat, which leads to their sticking or to the uptake of an aqueous or oily composition within considerably shorter time than e.g. with a rotationally driven treatment drum or with a rotationally driven driving dog within a treatment drum.

The raw pieces of meat need not be able to move freely within the internal volume against one another and can moreover, while carrying out the process, essentially completely fill the internal space resp. the internal volume. Therefore, the device allows a production process, in which the raw pieces of meat are arranged within an elastic or a rigid sheath, which can optionally be under vacuum. Furthermore, the device allows a process, in which the pieces of meat are subsequently shaped and cooked in the same sheath.

The device can for example be set up for a reciprocating movement of the at least one work surface over an amplitude of 1 mm, more preferably 2 mm, more preferably at least 5 mm or at least 10 mm, e.g. up to 200 mm, more preferably up to 50 mm or up to 20 mm. Further preferably, the device is set up for a jerkily reciprocating movement of the work surface. The device can be set up for a linear, sinusoidal, triangle-shaped or arc-shaped reciprocating movement of the work surface. Since the trajectory of the reciprocating movement affects the load onto the raw pieces of meat against work surfaces, a linear reciprocating movement is preferred for an internal volume resp. a sheath of rectangular shape resp. an arc-shaped reciprocating movement, in particular for an internal volume resp. a sheath of round to oval shape. When the device is set up for the reciprocating movement along exactly one motion axis, this motion axis is preferably non-linear, e.g. arched. In fact, a non-linear motion axis is beneficial for a uniform treatment of raw meat by its thorough mixing, also in the presence of an added liquid composition.

The device has work surfaces, which delimit an internal volume, in which raw pieces of meat are arranged while carrying out the process. The work surfaces can optionally tightly enclose the internal space circumferentially or be arranged with a spacing from one another, wherein it is preferred that, while carrying out the process, the raw pieces of meat are enclosed in a sheath, e.g. a plastic foil.

Preferably, a lower work surface can be opened resp. moved away from the internal volume to allow opening of the internal volume for the raw pieces of meat to fall out after the reciprocating movement. Further preferably, an upper work surface can be moved away from the internal volume to allow opening of the internal volume to fill in the raw pieces of meat. In this manner, the device can be filled while carrying out the process for batchwise treatment with raw pieces of meat after opening of an upper work surface, with subsequent closing of the internal volume by means of the upper work surface, and after the reciprocating movement opening of a lower work surface to allow falling out of the raw pieces of meat. Such upper and lower work surfaces to be opened, can be formed by only one work surface if the device moves from a first position, in which the one work surface is arranged above the internal volume, into a second position, in which this work surface is arranged below the internal volume.

Generally preferably, the work surfaces are temperature-controlled, in particular cooled, during the tumbling.

Generally, the work surfaces can, for example, be arranged to form a box with a triangular or rectangular, optionally polygonal cross-section. Alternatively, the work surfaces can comprise an internal space with an oval or a round cross-section, the terminal openings of which are covered by work surfaces, which can be arched or flat. Preferably, the work surfaces comprise a cylindrical internal volume.

In a first embodiment, the work surfaces can be fixed in relation to one another and the device is set up for mechanical loading of the raw pieces of meat arranged in the internal space delimited by the work surfaces by means of a reciprocating movement due to the work surfaces being fixed against one another and are connected with a drive motor for the reciprocating movement. A drive motor can generally have a rotary drive shaft, e.g. with an eccentric drive, or a drive motor can be a linear drive, e.g. an electric or hydraulic resp. pneumatic, linearly effective drive.

The reciprocating movement can be a linear movement, wherein the assembly of work surfaces is mounted in a linearly movable manner, or an arc-shaped movement including a movement along a low-frequency Lissajous figure, wherein the assembly of the work surfaces is mounted e.g. on a pivot bearing and at a distance therefrom, for example, on a work surface opposite the pivot bearing, connected with a drive motor for a reciprocating movement.

The above-mentioned movements can be optimized with respect to their intensity and amplitude via sensors for the respective process, since the filling amount of the molds can vary. The sensors measure e.g. the force transmission (e.g. pressure sensors), the conductivity and/or the color and are arranged in or on work surfaces.

In the first embodiment, the fixed assembly of the work surfaces to one another can be mounted movably in a frame, wherein a drive is attached between the frame and the assembly of work surfaces for the reciprocating movement of the fixed assembly of the work surfaces relative to the frame. In this embodiment, two or more assemblies of work surfaces, which have a common drive for the reciprocating movement, can optionally be arranged, wherein they are driven in such a manner by the drive that their reciprocating movement is antagonistic. Such an embodiment has the advantage that a compensation for the oscillations of the reciprocating movement is effected by the at least two assemblies of work surfaces that are driven to perform an antagonistic reciprocating movement.

In the first embodiment, the device can be set up to produce a rolling movement of the raw pieces of meat, wherein a sheath is preferably arranged in the internal volume spanned over by the work surfaces, the mean cross-section of which is smaller than the parallel mean cross-section of the internal volume. To produce a rolling movement, the work surfaces span over e.g. an internal volume with an at least triangular or rectangular, more preferably pentagonal to octagonal, symmetrical or not symmetrical cross-section, e.g. an oval or round cross-section and the device is set up to perform a reciprocating movement along a motion axis resp. in a plane, which runs approximately parallel up to a small angle, e.g. of 20° max., to this cross-section. The rolling movement, which can run in a direction, effects the reciprocating movement of the work surface.

In a closed mold, an underfilling (e.g. filling to 80%) of the internal volume, which is spanned over by the work surfaces will produce a round product with meat by the device being set up to produce the reciprocating movement in the form of low-frequency Lissajous figures, e.g. by the drive motor being controlled to produce oscillations of an assembly of work surfaces for their rotation promoting low-frequency Lissajous figures. Since the raw pieces of meat begin to stick together while carrying out the process, a rolling movement appears in the course of the process, which leads to producing meat products with an approximately round cross-section. Therein, the reciprocating movement can also be a revolving movement resp. be effected by a revolving movement along at least one motion axis of the work surfaces fixed in an assembly around the internal volume.

In a second embodiment, at least one of the work surfaces, preferably two opposite work surfaces, are movably guided relative to the other work surface for the reciprocating movement. In this embodiment, the device is set up such that the reciprocating movement of at least one work surface relative to the other work surfaces resp. against the internal volume spanned over by the work surfaces loads the raw pieces of meat mechanically at the frequency. In this embodiment of the device, the process can provide for that the internal volume is completely filled out by raw pieces of meat, preferably by raw pieces of meat, which are enclosed under vacuum by a sheath.

The reciprocating movement can be a linear movement, wherein also a work surface can be linearly movable, or an arc-shaped movement, wherein the at least one work surface is mounted e.g. on a pivot bearing and is connected at a distance therefrom, for example, on a work surface opposite the pivot bearing, with a drive motor for a reciprocating movement.

In the second embodiment, the at least one guided work surface, which is also driven to perform a reciprocating movement driven, can be a side wall, e.g. a longitudinal wall, if the work surfaces comprise a box-shaped internal volume, or the work surface, which is driven to perform a reciprocating movement can be part of the end wall resp. narrow-side wall for the assembly of the work surfaces around a box-shaped internal volume resp. a cylindrical internal volume or an internal volume with an oval cross-section.

In the second embodiment, it is preferred that two opposite work surfaces, which span over the internal volume, are driven to perform an antagonistic reciprocating movement (e.g. half-ovals that engage in one another).

Here, the driven work surface can be elastic in the second embodiment, e.g. in order to abut continuously to adjacent, optionally rigid work surfaces, and to be loaded resp. moved by a linearly guided drive or a rotational drive. A rotational drive can be a rotational element, which is loaded against the surface of the driven work surface facing away from the internal volume.

Alternatively or additionally, the driven work surface can be formed discontinuous to neighboring resp. adjacent work surfaces, e.g. as a linearly or rotationally driven work surface, which can consist of a plurality of subsections. In this embodiment, it is preferred that the internal volume, which is included in the work surface, is lined by an elastic sheath.

In the first embodiment, it is preferred that a process is filled by the internal volume spanned over by the work surfaces to 10-100% by volume, more preferably 40-100% by volume, more preferably 70-95% by volume, even more preferably 80-90% by volume, in order to achieve an effective mechanical loading on the raw pieces of meat against work surfaces during the reciprocating movement of the assembly of work surfaces fixed against one another.

The process shows that the mechanical load on the raw pieces of meat by means of reciprocating movement of at least one work surface relatively against the pieces of meat or also the impingement of the joined raw pieces of meat with a pulse, which penetrates the raw pieces of meat, leads to an effective treatment, in particular for tumbling for the subsequent sticking and cooking, in particular for boiled ham, and/or to effective uptaking of an aqueous or oily composition, which was added to the raw meat. The mechanical load leads to the speed change (resp. acceleration) of the raw pieces of meat for their compaction. It has shown that the mechanical load against the work walls by the reciprocating movement at the frequency is enough to open the meat structure sufficiently, resp. to let meat juice flow out, in order to allow the raw pieces of meat to adhere to one another resp. to stick to one another, so that the subsequent cooking leads to a cooked mass consisting of pieces of meat. A result comparable to conventional rumbling resp. tumbling in a drum over 8 hours, is obtained within 30 to 60 minutes, preferably within a maximum of 10 min or a maximum of 5 min, e.g. at a frequency of the reciprocating movement of 10 to 1 Hz, in particular 8 Hz, with the device according to the invention.

A particular advantage of the device according to the invention is that it allows the mechanical loading of the raw pieces of meat when they are enclosed in a sheath, optionally under vacuum. Therefore, the device allows a process, in which the raw pieces of meat are enclosed by a sheath, optionally under exclusion of air resp. under vacuum, and are mechanically loaded, with subsequent cooking in the sheath. Moreover, this embodiment allows handling of the mechanically loaded pieces of meat as a mass enclosed by the sheath and can in this manner avoid the handling for filling loose pieces of meat into a mold for the cooking as is required for conventional rumbling devices, and reduces the duration of contact of the pieces of meat with ambient air, which limits the possible contamination.

In the figures, the same reference numerals designate functionally equal elements. In all embodiments, the internal volume spanned over by the work surfaces 1-4 can be lined by an elastic sheath 11 or a rigid sheath 7, in which the raw pieces of meat 6 are arranged during the process.

The first embodiment of the device shown in FIG. 1 has an internal volume with a rectangular or oval resp. round cross-section, which is spanned over by the work surface 1 and the work surfaces 2, which cover the openings on the end faces of the internal volume. As schematically indicated by the motor M, the assembly of work surfaces 1, 2 fixed against one another is movably guided to a reciprocating movement, which can be in particular linear. Opposite the drive motor M, the assembly consisting of work surfaces 1, 2 can be mounted either against a frame or the underground. Alternatively, the assembly of work surfaces 1, 2 can be hung to a drive arm 5 coupled with the motor and, for example, mounted in a longitudinally movable manner in a vertically arranged linear guide.

Figure 2:
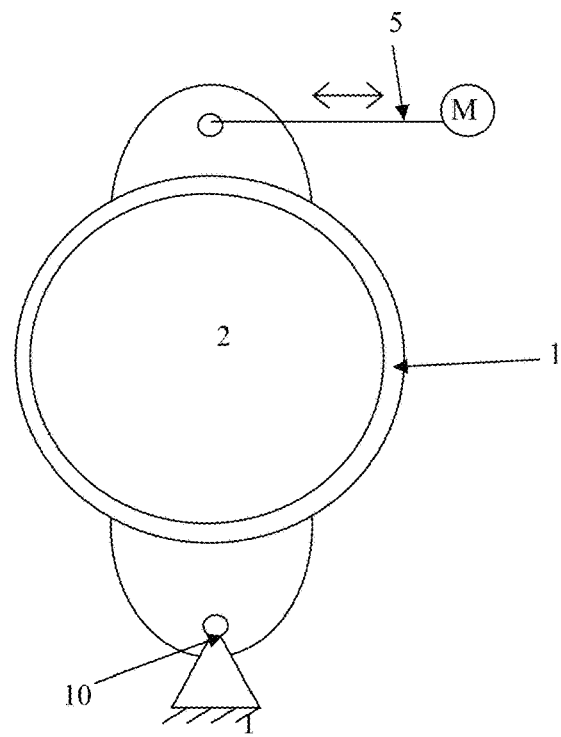

The embodiment shown in FIG. 2 is set up for an arched reciprocating movement and has a pivot bearing 10, which is, for example, attached to a stationary frame, and a spaced drive arm 5, which is connected with the motor M. FIG. 2 shows a variant, in which the work surface 1 spans over a circular or oval cross-section, the terminal openings of which are covered by the work surfaces 2. Work surfaces, which span over a circular or an oval cross-section, are generally preferably assembled from at least two half-molds resp. half-shells.

Figure 3:
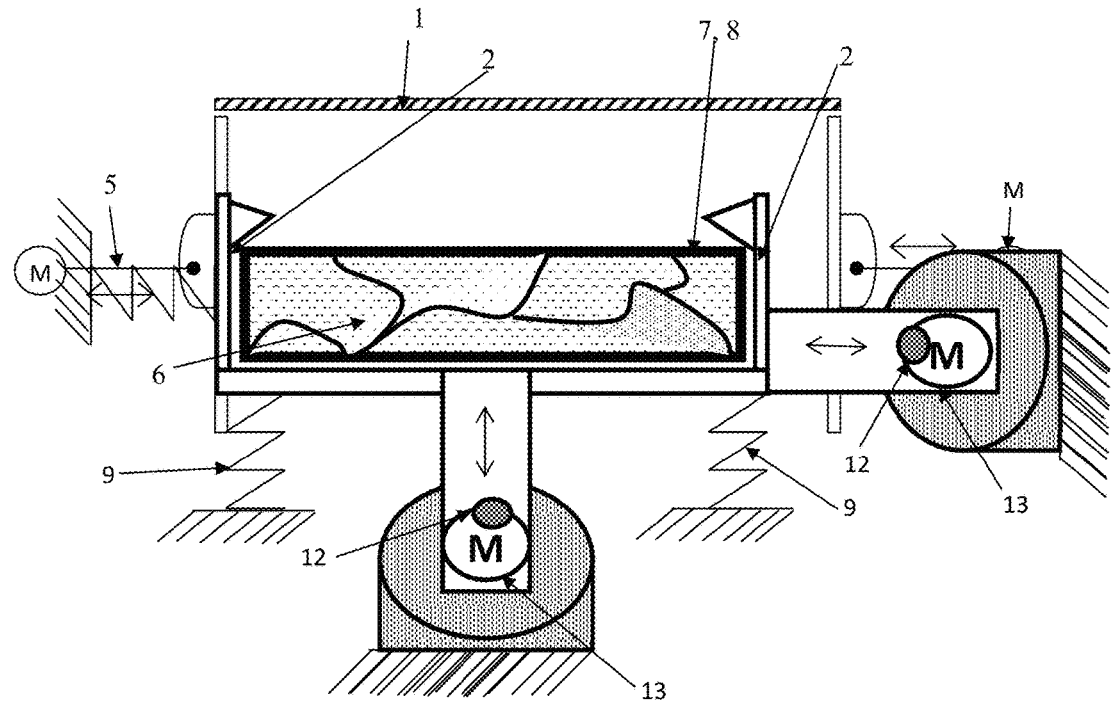

FIG. 3 shows a first embodiment, in which the raw pieces of meat 6 are arranged in a rigid sheath 7, e.g. a cooking box 8 having walls fixed against one another. The sheath 7 is surrounded by work surfaces 1-4, so that the movements that are transferred onto the work surfaces 1-4 by the drive motors M act on the rigid sheath 7. Due to the inertia of the raw pieces of meat 6, which are enclosed by the work surfaces 1-4 resp. the rigid sheath 7, these raw pieces of meat 6 are mechanically loaded during the reciprocating movement of the work surfaces 1-4. The drive motors M can be arranged such that the directions of the generated movements are approximately perpendicular to one another, so that preferably the work surfaces 1-4 fixed against one another are moved in all three spatial directions. The indicated spring elements 9 represent a bearing for the work surfaces 1-4. The drive motors M are schematically indicated by rotary drive shafts with an eccentric drive 12. Alternatively, the drive motors M can be linear drives, e.g. electric or hydraulic resp. pneumatic linear drives.

Figure 4:
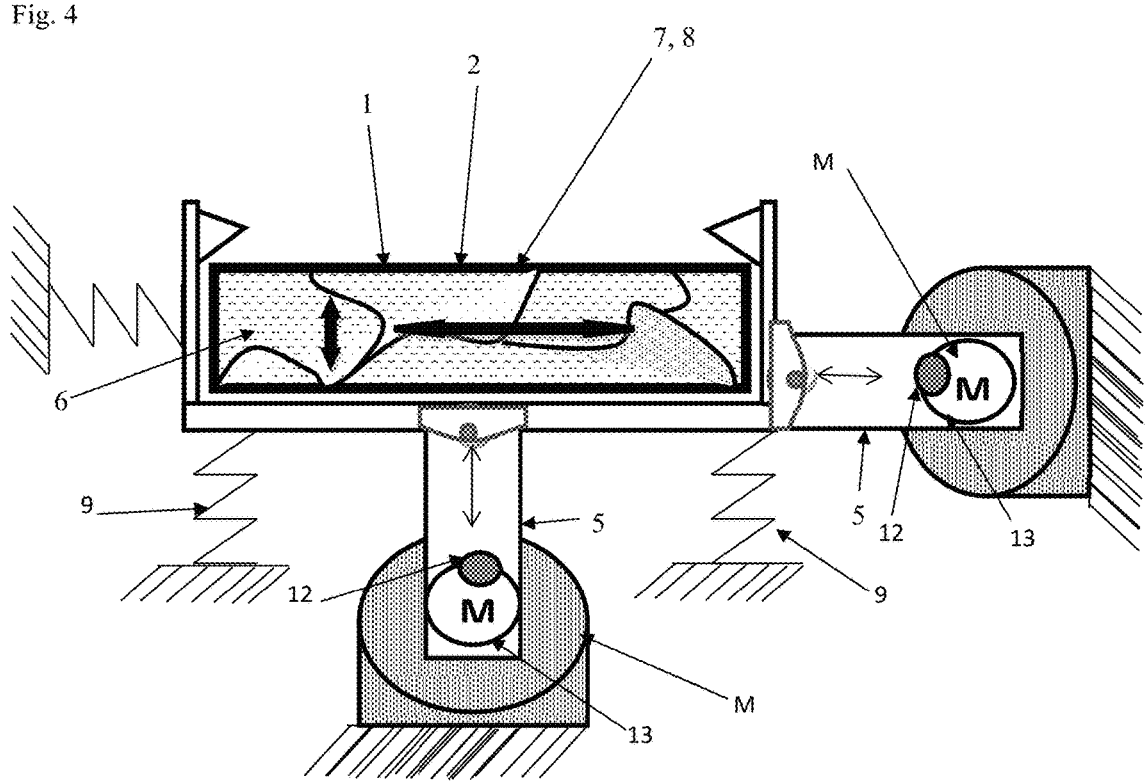

FIG. 4 shows an embodiment, in which the work surfaces 1-4 surround a rigid sheath 7 according to the embodiment shown in FIG. 3, in which the raw pieces of meat are arranged during the process. An elastic sheath 11, in which the raw pieces of meat are contained during the process, can be arranged within the rigid sheath 7, wherein the elastic sheath is preferably vacuumed in order to enclose the raw pieces of meat, if necessary in a mixture with salt and spices, tightly and essentially without any air inclusion. When using rotary drives as drive motors M, it is preferred that the connection with the assembly of work surfaces fixed against one another is established by means of an eccentric drive 12 on the drive motor and a rotary bearing 13. Generally, the device can have 2 drive motors as shown here, which are connected with the assembly of work surfaces fixed against one another, in order to drive them to perform two reciprocating movements arranged at an angle, in particular perpendicular to each other. Generally, two or more drive motors can be controlled to perform movements, which overlap to Lissajous figures.

Figure 5:
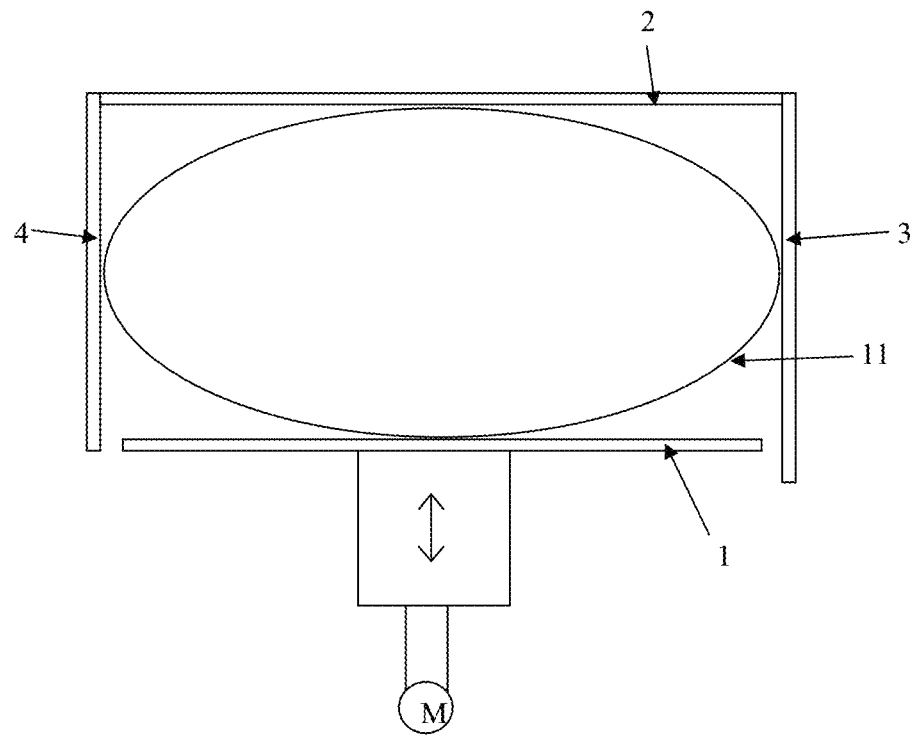

FIG. 5 shows a device according to the second embodiment, in which the work surfaces 1, 2, 3, 4 span over an internal volume with a rectangular cross-section, wherein the work surface 1 is driven by the motor M to a reciprocating movement, which is preferably linear, but can also be a tilting movement, for example about an axis which runs longitudinally with respect to the work surface 1. FIG. 5 shows an elastic sheath 11, which lines the internal volume, which is spanned over by the work surfaces 1-4 and in which the raw pieces of meat 6 (not represented) are contained during the process.

Figure 6:
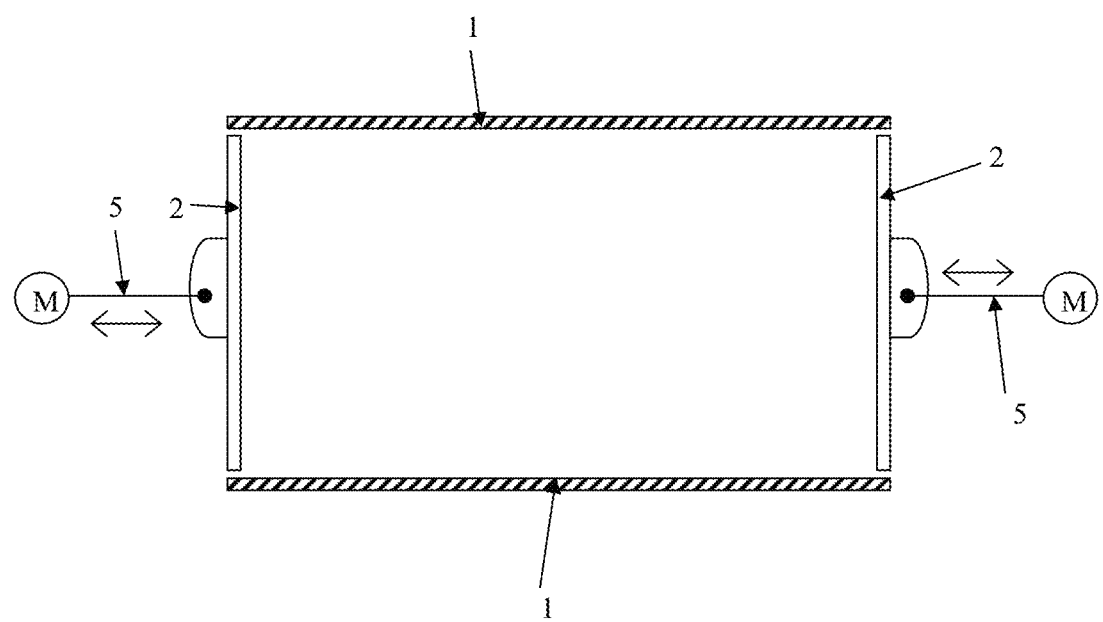

FIG. 6 shows the device according to the second embodiment, in which two opposite work surfaces 2 are driven slidably against one another to a reciprocating movement. These work surfaces 2 that are driven to a reciprocating movement can, for example, cover the terminal openings of an internal volume having a circular or an oval cross-section, which is spanned over by the work surfaces 1.

As an alternative to the two drive motors M shown in FIG. 6, the opposite work surfaces 2 can also be driven by a common motor via drive arms 5 to an antagonistic reciprocating movement.

Figure 7:
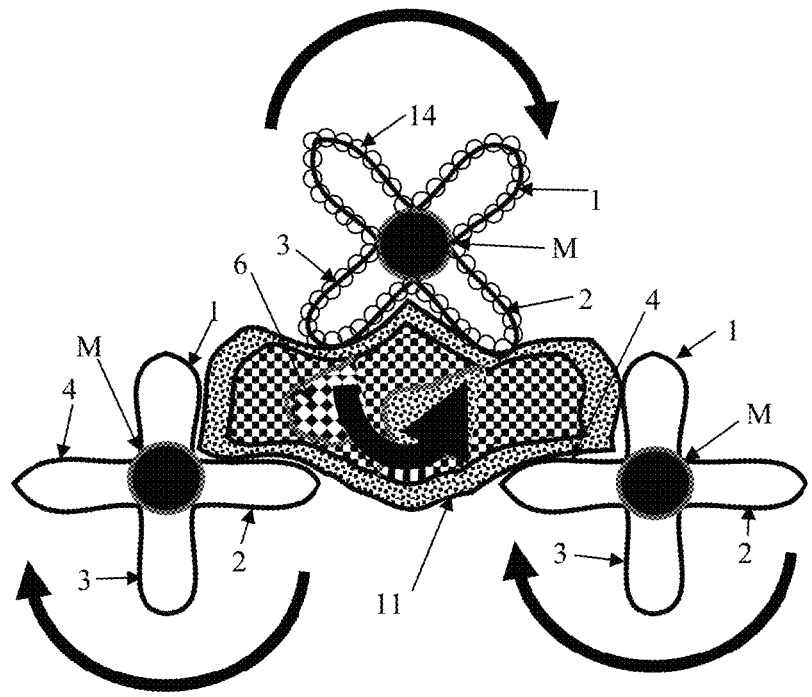
Figure 8:
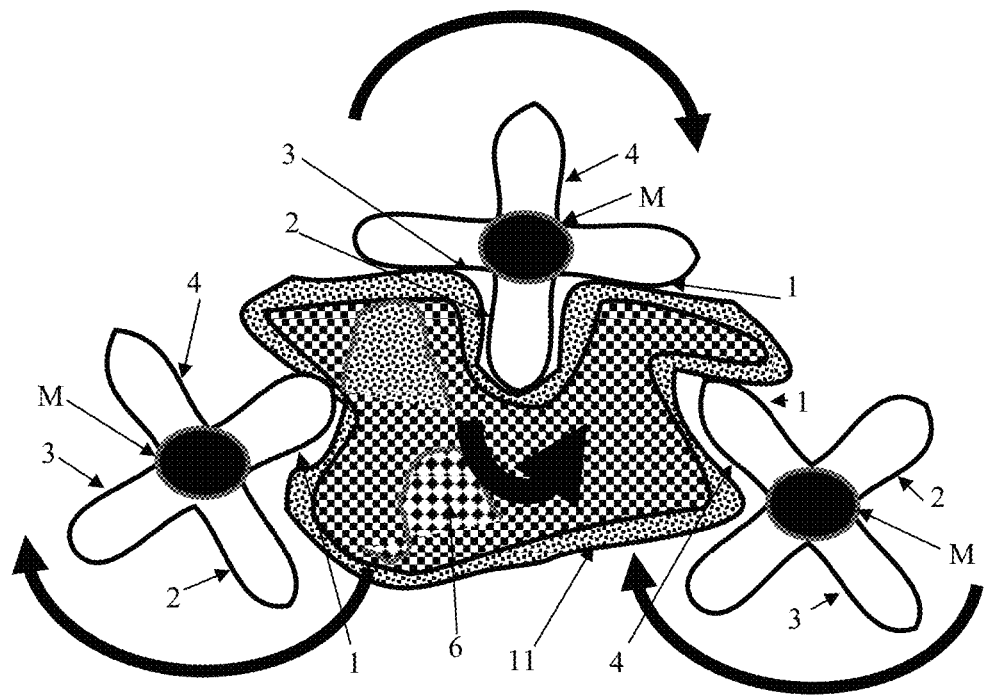
Figure 9:
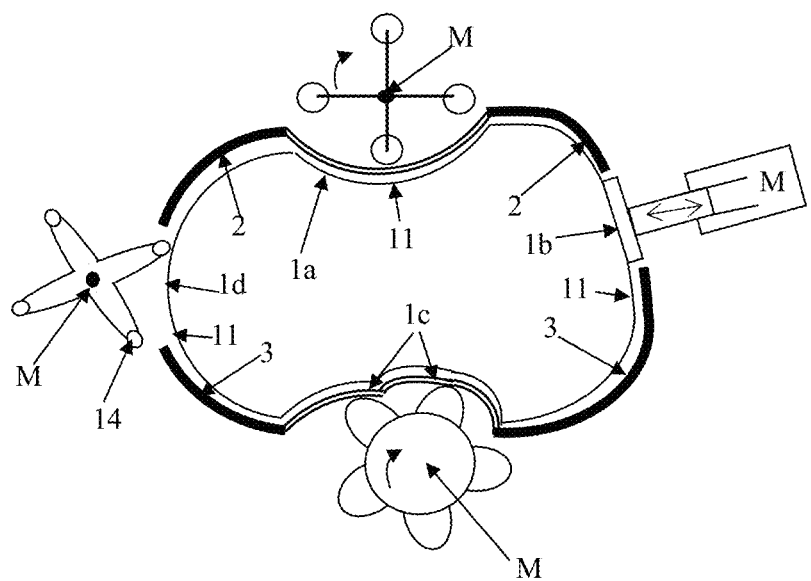

The embodiment shown in FIGS. 7 to 9 provides for the raw pieces of meat 6, which are enclosed by an elastic sheath 11, in particular under vacuum, being loaded by work surfaces 1-4, which are driven by a drive motor which carries out a rotary movement, or by a linear drive (not represented). Here, the FIGS. 7 and 8 show an embodiment, in which all work surfaces are driven and an elastic sheath 11 is held between the work surfaces. In this embodiment, the work surfaces 1-4 are discontinuous and comprise a varying internal volume, in which the elastic sheath 11 is arranged. Therein, the work surfaces 1-4 can be driven in the same direction of rotation, so that the elastic sheath 11 arranged between them can rotate freely in the opposite direction.

FIG. 8 shows a turned position of the work surfaces 1-4 compared with FIG. 7 and an elastic sheath 11 deformed according to the discontinuous internal volume formed by the work surfaces 1-4. Optionally, the work surfaces 1-4 can generally, in particular in the embodiment according to FIG. 7-9, be formed at least in sections by rollers 14, which are preferably mounted freely rotating, as is shown by way of example of the upper work surfaces 1-4 of FIG. 7.

In the embodiment shown in FIGS. 7 and 8 as well as 9, in addition to a reciprocating movement of the work surfaces 1-4, a rotating movement of the work surfaces 1-4 also effects a reciprocating movement of the sheath 11. Therefore, the sheath 11 forms the work surfaces in these embodiments. Therefore, at least with respect to this embodiment, the work surfaces 1-4 are also called work elements, wherein the loaded sheath driven by them to a reciprocating movement forms the work surfaces, which load the raw pieces of meat.

FIG. 9 shows according to the second embodiment a device with an internal volume, which is encompassed by work surfaces 1-4, of which at least one work surface 1a, 1b, 1c, 1d is driven. Therein, FIG. 9 also shows alternatives for driven work surfaces 1a, 1b, 1c, 1d, which are not exhaustive. The work surfaces 2-3 are not driven and rigid. By way of example, the work surface 1a shows an elastic work surface 1a, which is driven by rotating rollers 14 as the drive. The drive is loaded against the work surface 1a on the surface of work surface 1a that is facing away from the internal volume As a further example, the work surface 1b shows a linearly guided work surface 1b, which is driven e.g. by a linear drive. As a further example, the work surface 1c shows a work surface, which has rotary driven protrusions and the work surface 1d a rotary driven work surface 1d, which in sections has rollers 14, in particular at least in the terminal region. The internal volume, in particular its cross-section, can be discontinuous, e.g. as shown for work surfaces 1c and 1d, or continuous, as shown for the driven elastic work surface 1a and the linearly driven work surface 1b. In this embodiment, it is preferred that the internal volume is lined by an elastic sheath 11, resp. that the raw pieces of meat are enclosed by an elastic sheath 11, in particular under vacuum.

The above examples support preferred embodiments, such as a device for producing meat products with discontinuously or continuously arranged work surfaces (1, 2, 3, 4), which encompass an internal volume and at least one work surface (1) of which is arranged for mechanical loading against raw pieces of meat to be arranged in the internal volume, characterized in that the at least one work surface (1, 1a, 1b, 1c, 1d) is driven to perform a guided reciprocating movement with a frequency of at least 0.5 Hz for at least 0.5 min by means of a drive motor (M). The device can be characterized in that the internal volume is lined with an elastic sheath (11) or a rigid sheath (7). The device can be characterized in that the work surfaces (1, 2, 3, 4) are fixed relative to one another into an assembly and in this assembly are driven to a reciprocating movement. The device can be characterized in that the assembly of work surfaces (1, 2, 3, 4) fixed against one another is guided in a frame for the reciprocating movement. The device can be characterized in that the device has two assemblies of work surfaces (1, 2, 3, 4) fixed against one another, which are driven in a common frame to an antagonistic reciprocating movement. The device can be characterized in that the assembly of work surfaces (1, 2, 3, 4) fixed against one another is guided to the movement along at least two motion axes, wherein the device is set up to drive the assemblies along the motion axes each at different frequencies, to a reciprocating movement. The device can be characterized in that the at least one work surface (1, 1a, 1b, 1c, 1d) is driven to a reciprocating movement relative to the other work surfaces (2, 3, 4). The device can be characterized in that the at least one work surface (1, 1a, 1b, 1c, 1d) is driven to a reciprocating movement relative to the other work surfaces (2, 3, 4) and, optionally, its amplitude is dynamically adjustable. The device can be characterized in that the at least one work surface (1, 1a, 1b, 1c, 1d) is elastic and/or is driven by a linear drive motor (M) or a rotating drive motor (M). The device can be characterized in that, in work surfaces (1, 2, 3, 4), two spaced-apart electric contacts are arranged, which are connected with a conductivity measuring device or an impedance measuring device and in that the elastic sheath (11) or rigid sheath (7) is electrically conductive at least in the area adjacent to the electric contacts or the electric contacts penetrate the elastic sheath (11) or rigid sheath (7). The device can be characterized in that the drive motor (M) is controlled depending on the conductivity or impedance measuring device or depending on a detector for the amount of aqueous composition, which is present within the internal volume in addition to the raw pieces of meat. The device can be characterized in that the reciprocating movement is non-linear. The device can be characterized in that the internal volume comprised by the work surfaces has an at least triangular cross-section and the mean cross-section of the sheath (7, 11) is smaller than the mean cross-section of the internal volume and in that the plane of the reciprocating movement is in a plane that is parallel up to maximally 20° to the cross-section of the internal volume. The device can be characterized in that the work surfaces are movable against one another, comprising an internal volume with a round to oval cross-section and are driven on a base to perform a rolling movement around this cross-section. The device can be characterized in that in work surfaces (1, 2, 3, 4) at least 2 spaced-apart electric contacts are arranged, which are connected with a generator for production of electric current and in that the elastic sheath (11) or rigid sheath (7) is electrically conductive at least in the area adjacent to the electric contacts or the electric contacts penetrate the elastic sheath (11) or rigid sheath (7). The device can be, characterized in that the work surface is formed by a sheath (7, 11), which is driven by rotationally driven work elements to perform a reciprocating movement against the raw pieces of meat (6).

Example: Introduction of Aqueous Composition in Raw Meat

As example for raw meat, 10 kg of chicken breast without skin and bones, not size-reduced, with 20% by weight of aqueous composition of 12% by weight of table salt, 6% by weight of potato starch, 1.2% by weight of phosphate, water to 100%, were filled into a rigid cooking box to be closed, which box was covered with a fixed lid.

The cooking box was reciprocated along a first motion axis with 5 Hz over an amplitude of 7 cm for 8 min. Following this reciprocating movement, the raw chicken breast meat had taken up the aqueous composition essentially fully.

Alternatively, the reciprocating movement was performed along the first motion axis with 5 Hz and additionally along a second motion axis perpendicular thereto with 4.1 Hz, each over an amplitude of 7 cm for 5 min.

Alternatively, the meat with the aqueous composition could be contained in a plastic sheath, from which air was extracted, and the filled plastic sheath in the cooking box, which was closed with a fixed lid, could be loaded by the reciprocating movement of the cooking box.

LIST OF REFERENCE SIGNS 1, 1a, 1b, 1c, 1d work surface
2 work surface 3 work surface
4 work surface
5 drive arm
6 raw pieces of meat
7 rigid sheath
8 cooking box
9 spring elements
10 pivot bearing
11 elastic sheath
12 eccentric
13 rotary bearing
14 roller
M drive motor

The invention claimed is:

1. A device for producing meat products, comprising:
an assembly of work surfaces maintainable in a fixed relationship to one another during applying a mechanical loading on raw pieces of meat, the assembly being disposed to surround raw pieces of meat placed within the assembly;
a drive mechanism configured to drive the assembly along a first axis in a reciprocating movement of at least 10 mm along the first axis at frequency of at least 1 Hz and to drive the assembly along a second axis in a reciprocating movement of at least 10 mm along the second axis at frequency of at least 1 Hz, wherein the first axis and the second axis are angled with respect to each other, and the drive mechanism drives the assembly at different frequencies along the first and second axes.

2. The device of claim 1, wherein the drive mechanism comprises:
a first drive motor disposed to drive the assembly along the first axis; and
a second drive motor disposed to drive the assembly along the second axis.

3. The device according to claim 1, wherein the drive mechanism comprises a rotary bearing and an eccentric drive.

4. The device according to claim 2, wherein the drive mechanism comprises first and second drive motors and each of the first and second drive motors comprise a rotary bearing and an eccentric drive.

5. The device according to claim 3, wherein the first and second drive motors and axis are controlled to drive the assembly in a reciprocating movement in the form of a Lissajous figure.

6. The device according to claim 1, wherein first and second axes are approximately perpendicular to one another.

7. The device according to claim 1, wherein the drive mechanism comprises a linear drive motor.

8. The device according to claim 1, comprising springs providing a bearing for each of the plurality of work surfaces.

9. The device according to claim 1, wherein the drive mechanism is dynamically adjustable to generate drive frequencies along each of the first and second axes.

10. The device according to claim 1, wherein the drive mechanism is controlled to drive the assembly in a non-linear pattern.

11. The device according to claim 10, wherein the pattern is a Lissajous figure.

12. The device according to claim 9, wherein the pattern is an arched pattern.

13. The device according to claim 1, wherein a lower one of the work surfaces can be opened to drop pieces of meat after a mechanical loading operation.

14. The device according to claim 1, wherein the work surfaces are temperature controlled.

15. The device according to claim 1, wherein the work surfaces are arranged such that the assembly forms a box of triangular, rectangular, or polygonal cross-section.

16. The device according to claim 1, wherein the assembly is mounted on a pivot bearing.

17. The device according to claim 1, wherein the assembly is mounted movably in a frame, wherein the drive mechanism comprises a common motor and drive arms to drive a pair of the work surfaces in an antagonistic reciprocating movement.

18. The device according to claim 1, wherein the assembly is continuous and tightly encompasses the internal volume.

19. The device according to claim 1, wherein the assembly is discontinuous and encompass the internal volume with a spacing between the work surfaces.

20. The device according to claim 1, wherein an upper one of the work surfaces can be moved away from the internal volume defined by the assembly to allow opening of the internal volume.

21. The device according to claim 1, wherein the assembly is mounted movably in a frame as one of two or more assemblies, wherein the drive mechanism is attached between the frame and the assembly for the reciprocating movement of the assembly relative to the frame, and wherein the two or more assemblies, which have a common drive for the reciprocating movement, are arranged in the frame, wherein they are driven in such a manner by the drive that their reciprocating movement is antagonistic.

* * * * *